July 27, 1937.   J. O. MADISON   2,088,113
SHOCK ABSORBING PAD
Filed Nov. 16, 1934
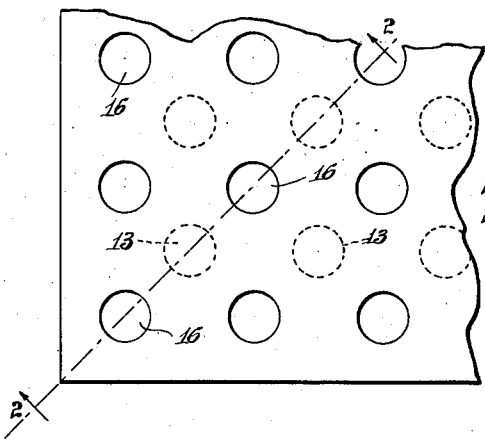
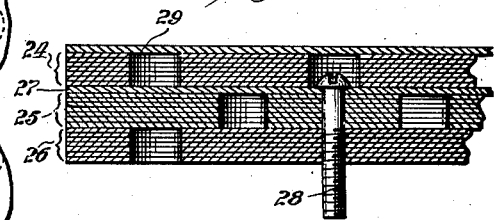
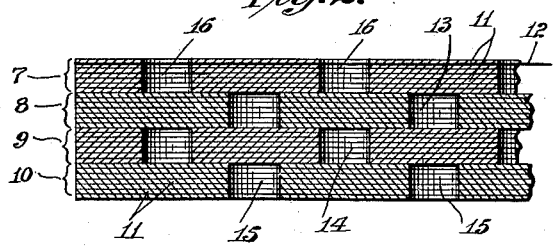
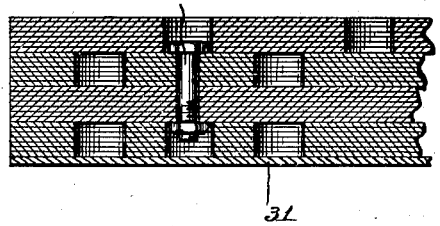
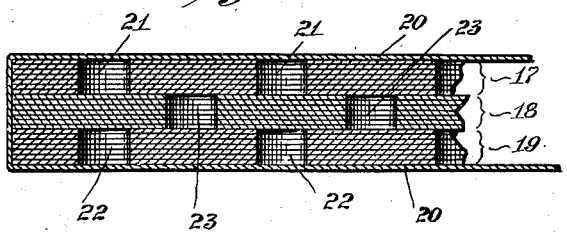
John O. Madison
INVENTOR
ATTORNEY Patented July 27, 1937

2,088,113

UNITED STATES PATENT OFFICE 2,088,113

SHOCK ABSORBING PAD

John O. Madison, Brooklyn, N. Y.; Jennie M. Madison executrix of the estate of said Madison, deceased Application November 16, 1934, Serial No. 753,256

2 Claims. (Cl. 154—54)

My invention relates to devices for minimizing the transmission of vibrations from one member to another and especially where great pressures are involved.

Many different kinds of material have been used for this general purpose such as wood, rubber and other resilient means. Where great pressures are involved, however, as in various kinds of railway work soft rubber is unsatisfactory. It is in fact too resilient and becomes set or hardened in the course of time and deteriorates when subjected to oil. Materials such as wood even when impregnated with wax and oil are fragile.

The main object of my invention is to provide a pad which is capable of sustaining great weight without permanent set or deformation and yet which is effective in preventing or eliminating vibration transmission and which is capable of preventing the production of resonant sounds.

In carrying out the invention I build up a material out of layers of fabric such as cotton duck, which are impregnated with and held together by a type of cement which results in a finished material that remains flexible for a very long time.

Very thin layers of soft rubber of approximately the same thickness as the woven fabric may be interspersed or employed at or near the surface of the pad. This pad is made up by perforating pads of the material described and assembling them with the perforations staggered to produce a compound pad made up of a number of layers of the cloth fabric and having air pockets in staggered arrangement. This pad may be enclosed in other material and reinforced exteriorly and interiorly by metal when desired.

Fig. 1 is a plan view of a fragment of a multiply shock absorbing pad showing air pockets.

Fig. 2 is a sectional view of the same on the plane of the line 2—2 of Fig. 1.

Figs. 3, 4 and 5 are sectional views of modified forms of pad.

The pad of Figs. 1 and 2 is made up of four elements or layers 7, 8, 9 and 10 each of which is made up of seven layers such as 11 of cloth impregnated with an adhesive compound of such a character that the fabric remains flexible for a very long time. These layers 11 may all be of the same thickness or some of them may be made thicker than others. A very thin layer 12 of soft rubber may be employed when desired but the soft rubber must be kept very thin so as to avoid the disadvantages commonly known to exist in soft rubber as above mentioned. When rubber is employed the material will, of course, be vulcanized in a proper manner.

Each of the layers 8 and 9 inside of the outer layers is provided with perforations such as 13 and 14 and these are staggered so that closed air pockets are formed when the layers are assembled. The outer layers 7 and 10 may also be provided with passages or pockets such as 16 and 15 if desired. The layers 7, 8, 9 and 10 are cemented together in any suitable manner but preferably by some form of adhesive or cement which retains its adhesive power for a very long time.

In the form shown in Fig. 3 there are only three layers 17, 18 and 19 which are made up in a manner similar to the manner above described. In this case however they are enclosed with a layer 20 of suitable material which is preferably waterproof and oilproof. This layer serves to seal the pockets 21 and 22 and, of course, the pockets 23 are sealed by the layers 17 and 19 on account of the arrangement of the holes.

In Fig. 4 I have shown a pad made up of three layers 24, 25 and 26 having air pockets and in this case reenforced by metallic plate 27 which may serve as an anchorage for the bolt or screw 28 used for fastening the pad in place. The top layer 29 in this case would not be put in place until after the screw 28 had been inserted. A layer 29 of any suitable material for any required purpose of reenforcement, waterproofing, oilproofing, etc. may be employed on the top and/or bottom if desired.

The form shown in Fig. 5 is similar to that shown in Fig. 2 but with a bolt or rivet 30 uniting two of the inner layers to each other. A bottom plate 31 may be provided for reenforcing or other purposes.

It should be understood that the holes or air pockets may be of any cross sectional shape desired but they should be so arranged as to form air pockets preferably sealed so as to provide a maximum of cushioning effect, the holes in each layer being staggered with respect to the holes in the adjacent layers.

Pads of this character are essentially applicable to conditions where a greater degree of yield must be permitted than where only a single layer such as 7 or 8 is provided.

I claim:

1. A shock absorbing pad including a number of superposed pads each of which is comprised of a number of layers of woven fabric impregnated with an adhesive adapted to cause the fabric to remain flexible for a long time, some of the fabric layers having therebetween a very thin layer of soft rubber, and the superposed pads being provided with staggered perforations or pockets.

2. A shock absorbing pad including a number of superposed pads each of which is comprised of a number of layers of woven fabric impregnated with an adhesive adapted to cause the fabric to remain flexible for a long time, some of the fabric layers having therebetween a very thin layer of soft rubber, and the superposed pads being provided with staggered perforations or pockets, and a metal plate between some of the superposed pads.

JOHN O. MADISON.